(12) United States Patent  (10) Patent No.: US 8,717,304 B2
Cho et al.  (45) Date of Patent: May 6, 2014

(54) APPARATUS, METHOD, AND MEDIUM FOR MULTI-TOUCH DECISION

(75) Inventors: Seong-Il Cho, Seoul (KR); Wook Chang, Seoul (KR); Joon-ah Park, Seoul (KR); Byung-seok Soh, Suwon-si (KR); Kyoung-ho Kang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1587 days.

(21) Appl. No.: 11/892,917

(22) Filed: Aug. 28, 2007

(65) Prior Publication Data

US 2008/0087477 A1   Apr. 17, 2008

(30) Foreign Application Priority Data

Oct. 11, 2006   (KR) .................. 10-2006-0099012

(51) Int. Cl.
*G06F 3/041* (2006.01)

(52) U.S. Cl.
USPC ........................................................ 345/173

(58) Field of Classification Search
USPC ..................... 345/173–178; 178/18.01–18.07
See application file for complete search history.

(56) References Cited

U.S. PATENT DOCUMENTS

| 8,059,102 | B2* | 11/2011 | Rimon et al. ................. 345/173 |
| 2002/0149571 | A1 | 10/2002 | Roberts |
| 2005/0052427 | A1* | 3/2005 | Wu et al. ....................... 345/173 |
| 2006/0097991 | A1* | 5/2006 | Hotelling et al. ............. 345/173 |

FOREIGN PATENT DOCUMENTS

| JP | 2005-49978 | 2/2005 |
| JP | 2005-100391 | 4/2005 |
| KR | 10-2004-0037247 | 5/2004 |
| WO | 97/30416 | 8/1997 |

OTHER PUBLICATIONS

Korean Office Action dated Dec. 7, 2007, issued in corresponding Korean Patent Application No. 10-2006-0099012.
Japanese Office Action for related Japanese Patent Application No. 2007-263436, mailed on Jun. 26, 2012.

* cited by examiner

*Primary Examiner* — Rodney Amadiz
(74) *Attorney, Agent, or Firm* — Staas & Halsey LLP

(57) ABSTRACT

A multi-touch decision apparatus, method, and medium are provided. The apparatus includes a sensor to sense an object contacting a specific position corresponding to one among a plurality of sensing channels arranged in a predetermined array, a detector to detect at least one of information about signal strength of the sensing channel in which the object is sensed and information about the number of sensing channels having a signal strength exceeding a first threshold, and a controller to determine whether a single touch or a multi touch has been sensed based on the detected information.

18 Claims, 5 Drawing Sheets

US 8,717,304 B2

APPARATUS, METHOD, AND MEDIUM FOR MULTI-TOUCH DECISION

CROSS-REFERENCE TO RELATED APPLICATIONS

This application claims priority benefit from Korean Patent Application No. 10-2006-0099012 filed on Oct. 11, 2006 in the Korean Intellectual Property Office, the disclosure of which is incorporated herein by reference in its entirety.

BACKGROUND

1. Field

Embodiments relate to an apparatus, method, and medium for a multi-touch decision, and more particularly, to a multi-touch decision apparatus, method, and medium by which single touch and multi touch operations can be discriminated from each other, thereby facilitating implementation of a multi-finger user interface.

2. Description of the Related Art

In designing a multi-finger user interface, it is necessary to identify and analyze the various kinds of operations that can be performed by a user's hands, such as a single touch, or multiple touches. In particular, discriminating a single touch operation from a multi touch operation is a fundamental issue in the multi-finger user interface.

Conventionally, in order to implement a multi-finger user interface, computation of multi-touch locations is enabled by changing the system configuration of a single-touch sensor, rather than directly using the single-touch sensor without any change in the configuration. That is to say, changing the hardware configuration has made it possible to discriminate a single touch from multiple touches, but has resulted in a cost increase due to the use of additional modules, and procedural inefficiency due to the change in the hardware configuration.

Another conventional sensor for identifying the position of a contact point is a 2-D capacitive position sensor, which has been proposed to implement a multi-finger user interface by changing the arrangement of and algorithm of sensing channels having a predetermined structure, as disclosed in Japanese Patent Publication No. 2005-049978. However, the disadvantage of this technique is that accurate determination of the number of contact points is required for implementation of the algorithm for sensing channels.

Accordingly, there exists a substantial demand for advanced 2-D capacitive position sensors for use in small-sized mobile terminal equipment, which can discriminate a single touch operation from a multi touch operation, thereby facilitating implementation of a multi-finger user interface.

SUMMARY

In an aspect of embodiments, there is provided a multi-touch decision apparatus, method, and medium, by which single touch and multi touch operations can be accurately discriminated from each other, thereby facilitating implementation of a multi-finger user interface.

According to an aspect of embodiments, there is provided a multi-touch decision apparatus including a sensor to sense an object contacting a specific position corresponding to one among a plurality of sensing channels arranged in a predetermined array, a detector to detect at least one of information about signal strength of the sensing channel in which the object is sensed and information about the number of sensing channels having a signal strength exceeding a first threshold, and a controller to determine whether a single touch or a multi touch has been sensed based on the detected information.

According to another aspect of embodiments, there is provided a multi-touch decision method including sensing an object contacting a specific position corresponding to one among a plurality of sensing channels arranged in a predetermined array, detecting at least one of information about signal strength of the sensing channel in which the object is sensed and information about the number of sensing channels having a signal strength exceeding a first threshold, and deciding whether a single touch or a multi touch has been sensed based on the detected information.

According to another aspect, there is provided at least one computer readable medium storing computer readable instructions to implement methods of embodiments

BRIEF DESCRIPTION OF THE DRAWINGS

These and/or other aspects, features, and advantages will become apparent and more readily appreciated from the following description of exemplary embodiments, taken in conjunction with the accompanying drawings of which.

DETAILED DESCRIPTION OF EMBODIMENTS

Figure 1:
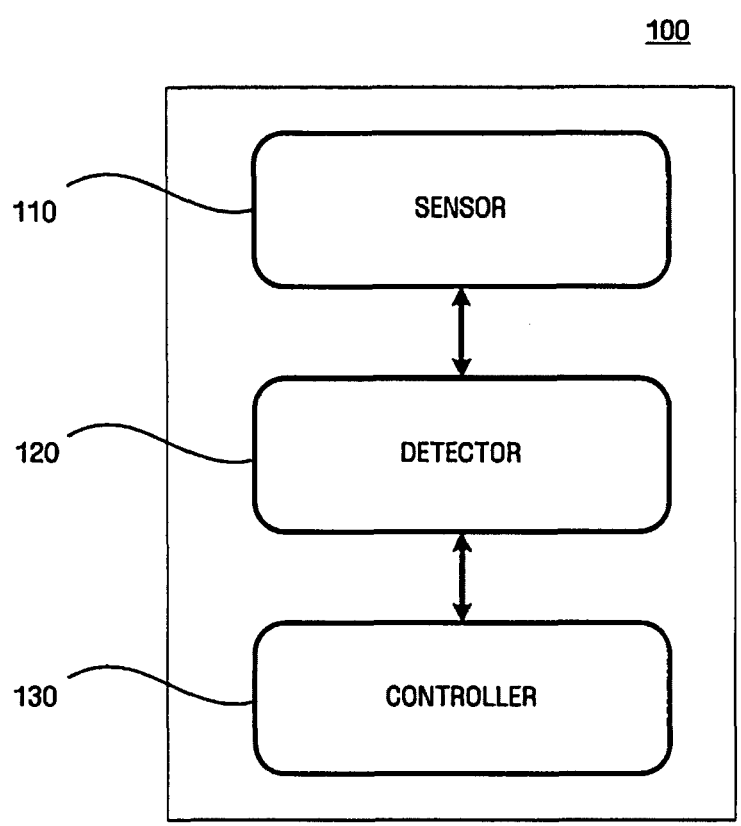
FIG. 1 is a block diagram of a multi-touch decision apparatus according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

FIG. 1 is a block diagram of a multi-touch decision apparatus (100) according to an exemplary embodiment.

The multi-touch decision apparatus 100 includes a sensor 110, a detector 120, and a controller 130. In FIG. 1, each block may represent a module.

The sensor 110 senses an object contacting a specific position corresponding to one among a plurality of sensing channels arranged in a predetermined array. The predetermined array may be a grid array having a predetermined number of electrodes (sensing channels) arranged in the direction of horizontal and vertical axes. When a user touches the sensing channels with his/her finger, the sensor 110 senses the position contacted by the user's finger.

The detector 120 detects at least one of information about signal strength of the sensing channel in which the object is sensed and information about the number of sensing channels having a signal strength exceeding a first threshold. With regard to magnitudes of the signal strengths, the signal strength of a sensing channel touched by a user's finger is greater than that of a neighboring sensing channel not touched by the user's finger. In general, the sum of the signal strengths in multi-touch sensing is greater than the sum of the signal strengths in single touch sensing. The first threshold is a predetermined value, which is experimentally determined based on the signal strengths obtained by measuring variations in signal strength when the user's finger contacts a sensing channel. In addition, the first threshold may be a predetermined reference value corresponding to a particular sensing channel. That is to say, the value of the first threshold may vary according to the sensing channel touched by the finger. The following exemplary embodiment will be described on the basis that the first threshold is an experimentally determined constant value.

The detector 120 compares the signal strengths sensed by the sensing channels with the first threshold and determines the number of sensing channels having a signal strength exceeding the first threshold. In this case, the detector 120 assigns a value '1' to each of the sensing channels having a signal strength exceeding the first threshold and a value '0' to each of the sensing channels having a signal strength not exceeding the first threshold. Accordingly, a signal strength distribution of the sensing channels, composed of 1's and 0's, can be observed.

The controller 130 decides whether a single touch or a multi touch has been sensed based on the detected information. The controller 130 may decide whether a single touch or a multi touch has been sensed based on at least one of information about signal strength of the sensing channel in which the object is sensed and information about the number of sensing channels having a signal strength exceeding a first threshold. That is to say, in a single touch operation, the controller 130 decides whether a single touch or a multi touch has been sensed according to whether the sum of the signal strengths exceeds a predetermined value or not. In addition, the controller 130 decides whether a single touch or a multi touch has been sensed according to whether the number of sensing channels having a signal strength exceeding the first threshold exceeds a second threshold. The second threshold is a predetermined value obtained by measuring the number of sensing channels having a signal strength exceeding the first threshold and can be utilized as a reference in the decision about whether a single touch or a multi touch has been sensed. R Here, the second threshold may vary according to the array of sensing channels. In addition, the controller 130 decides whether a single touch or a multi touch has been sensed based on both information about signal strengths and information about the number of sensing channels.

Figure 2:
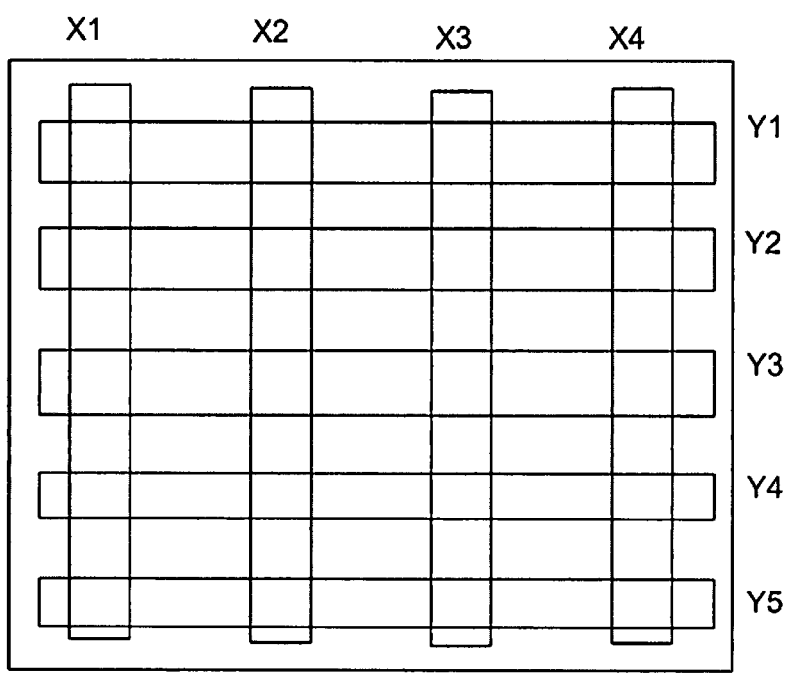
FIG. 2 illustrates an example of a sensing channel structure according to an exemplary embodiment.

FIG. 2 illustrates an example of a sensing channel structure according to an exemplary embodiment.

To facilitate understanding of exemplary embodiments, an explanation will be given with regard to a sensing channel (electrode) structure 200 having four X-axis sensing channels X1~X4, five Y-axis sensing channels Y1~Y5 by way of example. As shown in FIG. 2, sensing channels are arranged in a grid array in parallel on the X- and Y-axis. When a user touches a specific position of the sensing channels with his or her finger, the position contacted by the user's finger is sensed. Then, the detector 120 can detect at least one of information about a signal strength of the sensing channel contacted by the finger and information about the number of sensing channels having a signal strength exceeding a first threshold. Here, the first threshold is a predetermined value, which is experimentally determined based on signal strengths obtained by measuring variations in signal strength when the user's finger contacts the sensing channel. In addition, the first threshold may be set as a different value for a different sensing channel.

Figure 3:
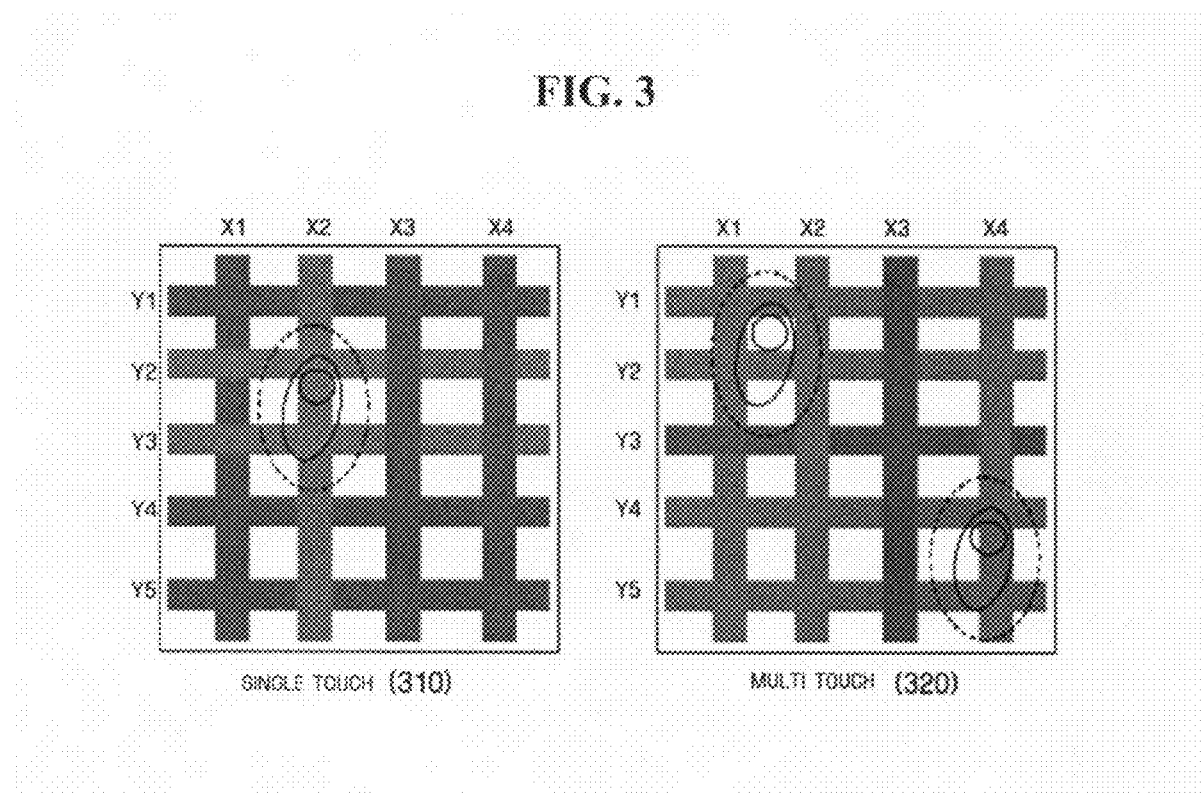
FIG. 3 illustrates variations in signal strength in cases of operations by a single touch and a multi touch.

FIG. 3 illustrates variations in the signal strength in the case of a single touch and the case of a multi touch according to an exemplary embodiment. That is, FIG. 3 illustrates one finger (corresponding to the single touch operation 310) and two fingers (corresponding to the multi touch operation 320) contacting sensing channels having "2-D capacitive position sensors, respectively, for example. When a sensing channel is contacted by two fingers, signal strengths of positions contacted by the two fingers vary and the sum of the overall signal strengths is larger than that in a case when a sensing channel is contacted by one finger. In addition, a difference between sensing channels showing a greater variation in the signal strength and sensing channels showing a smaller variation in the signal strength can be identified according to the positions of the respective fingers. More details will now be explained.

First, assumptions are made that signal strengths of the respective sensing channels with respect to the X- and Y-axis are defined by Xi(t) and Yi(t), respectively, and i=1, 2, 3, 4, or 5. Here, the farther from the contact position, the smaller the signal strength at the contact position, which can be represented by the following expression (1):

$$X2(t) > X1(t), X2(t) > X3(t), X2(t) > X4(t), Y2(t) > Y1(t), Y2(t) > Y4(t), Y2(t) > Y5(t), Y3(t) > Y1(t), Y3(t) > Y4(t), Y3(t) > Y5(t) \quad (1)$$

wherein $X2(t)$ indicates a signal strength in a case where a finger is positioned on a sensing channel X2, and is greater than $X1(t)$ indicating a signal strength for a neighboring sensing channel X1. In the same manner, $Y2(t)$ indicates a signal strength in a case where a finger is positioned on a sensing channel Y2, and is greater than $Y1(t)$ indicating a signal strength for a neighboring sensing channel Y1.

In a case of the multi touch operation 320, the following expression (2) is given:

$$X1(t) > X3(t), X2(t) > X3(t), X4(t) > X3(t), Y1(t) > Y3(t), Y2(t) > Y3(t), Y4(t) > Y3(t), Y5(t) > Y3(t) \quad (2)$$

wherein a signal strength of a sensing channel where a finger is positioned is greater than that of a neighboring sensing channel, as described above in Expression (1).

Based on the Expressions (1) and (2), single-touch or multi-touch decision principles according to an exemplary embodiment will be described in greater detail with reference to FIGS. 4 and 5.

Figure 4:
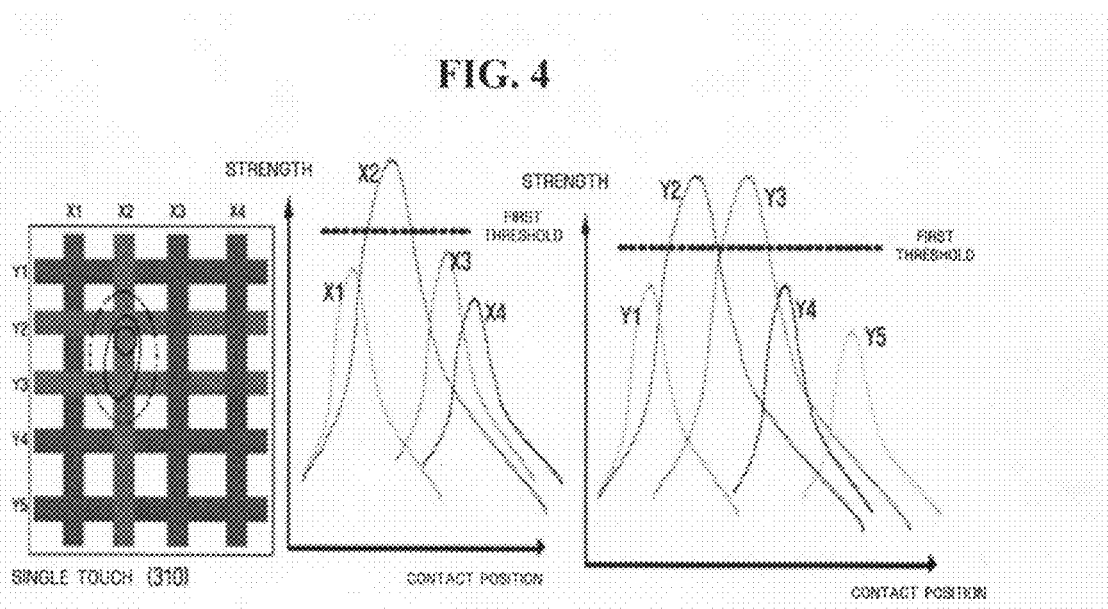
FIG. 4 illustrates a single-touch decision principle according to an exemplary embodiment.

FIG. 4 illustrates a signal strength single-touch decision principle according to an exemplary embodiment.

In a case where one finger contacts the sensing channel (that is, single touch operation 310 of FIG. 3), the detector 120 compares a signal strength sensed by the sensing channel contacted by the finger with the first threshold. The first threshold may be a predetermined value, which is experimentally determined based on signal strengths obtained by measuring variations in signal strength when the finger contacts the sensing channel. Alternatively, the first threshold may be adaptively set as a different value for a different sensing channel. In the latter case, the detector 120 compares a signal strength of a pertinent sensing channel with a first threshold adaptively set for the pertinent sensing channel. In the following description, an exemplary embodiment will be described on the basis that the first threshold is an experimentally determined constant value.

A sensing channel of a position contacted by the finger has a signal strength greater than a neighboring sensing channel, and the signal strength of the contact position is greater than the first threshold, which can be represented by Expression (3) below:

$$X1(t) < \text{First threshold}, X2(t) > \text{First threshold}, X3(t) < \text{First threshold}, X4(t) > \text{First threshold}, Y1(t) < \text{First threshold}, Y2(t) > \text{First threshold}, Y3(t) > \text{First threshold}, Y4(t) < \text{First threshold}, Y5(t) < \text{First threshold} \quad (3)$$

Referring to Expression (3) and FIG. 4, it is confirmed that sensing channels X2, Y2, and Y3 respectively have signals strengths $X2(t)$, $Y2(t)$, and $Y3(t)$ exceeding the first threshold.

In this case, the detector 120 may assign a value '1' to each of the sensing channels having a signal strength exceeding the first threshold and a value '0' to each of the sensing channels having a signal strength not exceeding the first threshold. Accordingly, a signal strength distribution of the sensing channels, composed of 1's and 0's, can be observed. That is to say, in a case where one finger is contacted, that is, in a case of the single touch operation 310, the sensing channels X2, Y2, and Y3 respectively have signal strengths $X2(t)$, $Y2(t)$, and $Y3(t)$ exceeding the first threshold. Accordingly, 1's are assigned to the sensing channels X2, Y2, and Y3 and 0's are assigned to the other sensing channels having a signal strength not exceeding the first threshold.

The number of sensing channels having a signal strength exceeding the first threshold, which will be referred to as a second threshold hereinafter, is three (3) in total. That is, the value 3 is obtained by a single finger touch operation. When the number of sensing channels exceeds the value 3, the controller 130 may decide that the operation is based on multi-touch sensing. The second threshold may vary according to the array of sensing channels and may be an experimentally obtained value.

Figure 5:
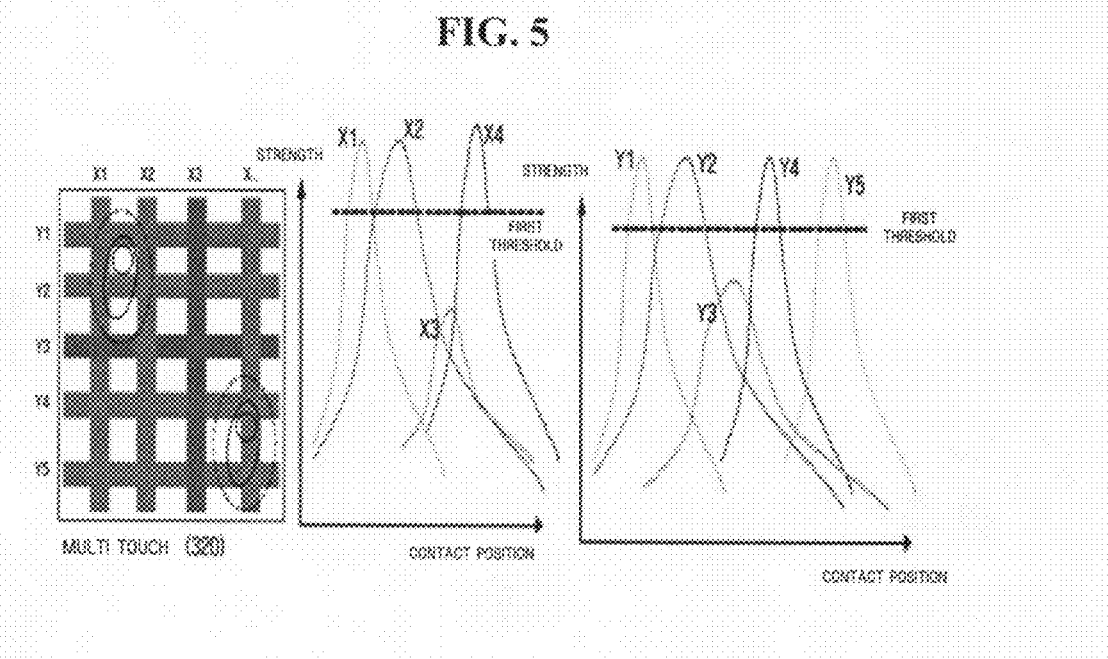
FIG. 5 illustrates a multi-touch decision principle according to an exemplary embodiment.

In a case where two fingers are contacted, as shown in FIG. 5, that is, in a case of the multi touch operation 320 of FIG. 3, sensing channels X1, X2, X4, Y1, Y2, Y4, and Y5 respectively have signals strengths $X1(t)$, $X2(t)$, $X4(t)$, $Y1(t)$, $Y2(t)$, $Y4(t)$, and $Y5(t)$ exceeding the first threshold. Thus, the number of sensing channels having a signal strength exceeding the first threshold is seven (7) in total. That is, if the value 7 is greater than the second threshold, i.e., 3, the controller 130 decides that the operation is based on multi-touch sensing.

Figure 6:
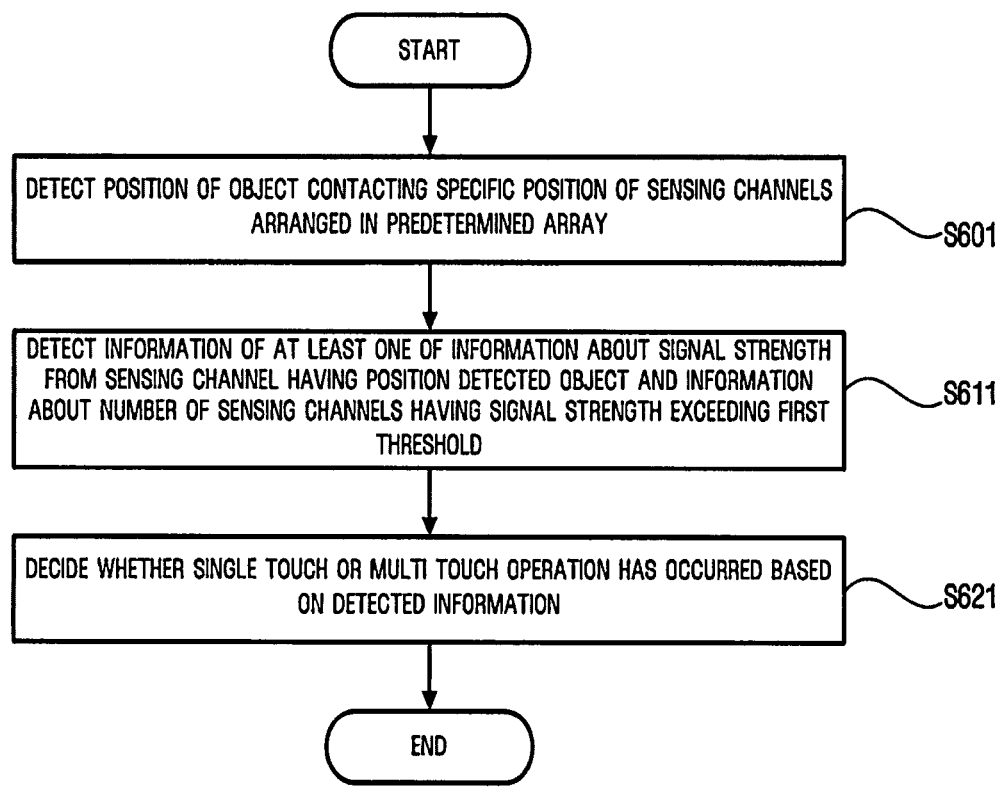
FIG. 6 is a flow chart illustrating a multi-touch decision method according to an exemplary embodiment.

FIG. 6 is a flow chart illustrating a multi-touch decision method according to an exemplary embodiment.

In S601, the sensor 110 senses an object contacting a specific position on sensing channels arranged in a predetermined array.

In S611, the detector 120 detects at least one of information about signal strength of the sensing channel in which the object is sensed and information about the number of sensing channels having a signal strength exceeding the first threshold. The first threshold is a predetermined value, which is experimentally determined based on signal strengths obtained by measuring variations in signal strength when a user's finger contacts a sensing channel.

In S621, the controller 130 decides whether a single touch or a multi touch has been sensed based on the information detected in operation S611. In this case, decision whether a single touch or a multi touch has been sensed is made according to whether the sum of the signal strengths exceeds a predetermined value or not. In addition, it is decided whether a single touch or a multi touch has been sensed according to whether the number of sensing channels having a signal strength exceeding the first threshold exceeds a second threshold. The second threshold is a predetermined value obtained by measuring the number of sensing channels having a signal strength exceeding the first threshold.

In addition to the above-described exemplary embodiments, exemplary embodiments can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. The medium/media may also be a distributed network, so that the computer readable code/instructions are stored/transferred and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of exemplary embodiments, or they may be of the kind well-known and available to those skilled in the art of computer hardware and/or computer software.

As described above, it is decided whether a single touch or a multi touch has been sensed according to whether the number of sensing channels having a signal strength exceeding the first threshold exceeds a second threshold or not. In addition, the sum of the signal strengths can also be utilized in the single-touch or multi-touch decision. Further, both information about signal strengths and information about the number of sensing channels can be utilized in the single-touch or multi-touch decision. Details of these contents are the same as described above with reference to the illustrated exemplary embodiments.

According to exemplary embodiments, it can be accurately decided whether a single touch or a multi touch has been sensed without errors.

Although a few exemplary embodiments have been shown and described, it would be appreciated by those skilled in the art that changes may be made in these exemplary embodiments, the scope of which is defined in the claims and their equivalents.

What is claimed is:

1. A multi-touch decision apparatus comprising:
a sensor to sense an object contacting a specific position corresponding to one among a plurality of sensing channels arranged in a predetermined array;
a detector to detect at least one of information about signal strength of the sensing channel in which the object is sensed and information about the number of sensing channels having a signal strength exceeding a first threshold; and
a controller to determine whether a single touch or a multi touch has been sensed based on the detected information,
wherein when the number of sensing channels having the signal strength exceeding the first threshold is greater than a second threshold, the controller determines that a multi touch has been sensed.

2. The multi-touch decision apparatus of claim 1, wherein the first threshold is a predetermined value based on the signal strengths obtained by measuring variations in signal strength when an object contacts a sensing channel.

3. The multi-touch decision apparatus of claim 2, wherein the second threshold is a predetermined value based on the number of sensing channels having a signal strength exceeding the first threshold.

4. The multi-touch decision apparatus of claim 1, wherein each of the sensing channels is a 2-D capacitive position sensor.

5. The multi-touch decision apparatus of claim 1, wherein the first threshold is a predetermined reference value, which corresponds to a particular one among the sensing channels.

6. The multi-touch decision apparatus of claim 1, wherein the first threshold is a predetermined reference value, which varies according to the touched sensing channel.

7. A multi-touch decision apparatus comprising:
a sensor to sense an object contacting a specific position corresponding to one among a plurality of sensing channels arranged in a predetermined array;
a detector to detect at least one of information about signal strength of the sensing channel in which the object is sensed and information about the number of sensing channels having a signal strength exceeding a first threshold; and
a controller to determine whether a single touch or a multi touch has been sensed based on the detected information,
wherein when the sum of the signal strengths and the number of sensing channels having a signal strength exceeding the first threshold respectively exceed predetermined values, the controller decides that a multi touch has been sensed.

8. The multi-touch decision apparatus of claim 7, wherein the first threshold is a predetermined reference value, which varies according to the touched sensing channel.

9. A multi-touch decision method comprising:
sensing an object contacting a specific position corresponding to one among a plurality of sensing channels arranged in a predetermined array;
detecting at least one of information about signal strength of the sensing channel in which the object is sensed and information about the number of sensing channels having a signal strength exceeding a first threshold; and
deciding whether a single touch or a multi touch has been sensed based on the detected information,
wherein when the number of sensing channels having the signal strength exceeding the first threshold is greater than a second threshold, there is a determination that a multi touch has been sensed.

10. The multi-touch decision method of claim 9, wherein the first threshold is a predetermined value based on the signal strengths obtained by measuring variations in signal strength when an object contacts a sensing channel.

11. The multi-touch decision method of claim 10, wherein the second threshold is a predetermined value based on the number of sensing channels having a signal strength exceeding the first threshold.

12. The multi-touch decision method of claim 9, wherein each of the sensing channels is a 2-D capacitive position sensor.

13. The multi-touch decision method of claim 9, wherein the first threshold is a predetermined reference value, which corresponds to a particular one among the sensing channels.

14. At least one computer readable medium storing computer readable instructions that control at least one processor to implement the method of claim 9.

15. The multi-touch decision method of claim 9, wherein the first threshold is a predetermined reference value, which varies according to the touched sensing channel.

16. A multi-touch decision method comprising:
sensing an object contacting a specific position corresponding to one among a plurality of sensing channels arranged in a predetermined array;
detecting at least one of information about signal strength of the sensing channel in which the object is sensed and information about the number of sensing channels having a signal strength exceeding a first threshold; and
deciding whether a single touch or a multi touch has been sensed based on the detected information,
wherein when the sum of the signal strengths and the number of sensing channels having a signal strength exceeding the first threshold respectively exceed predetermined values, multi-touch sensing is decided to have occurred.

17. At least one computer readable medium storing computer readable instructions that control at least one processor to implement the method of claim 16.

18. The multi-touch decision method of claim 16, wherein the first threshold is a predetermined reference value, which varies according to the touched sensing channel.

* * * * *